United States Patent
Girardin et al.

(10) Patent No.: US 9,678,479 B2
(45) Date of Patent: Jun. 13, 2017

(54) NON-DISMANTLABLE SHOCK-PROOF SYSTEM FOR TIMEPIECE

(71) Applicant: ETA SA Manufacture Horlogere Suisse, Grenchen (CH)

(72) Inventors: Yves Girardin, Courtetelle (CH); Ivan Villar, Bienne (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 14/409,696

(22) PCT Filed: Jun. 19, 2013

(86) PCT No.: PCT/EP2013/062801
§ 371 (c)(1),
(2) Date: Dec. 19, 2014

(87) PCT Pub. No.: WO2013/190011
PCT Pub. Date: Dec. 27, 2013

(65) Prior Publication Data
US 2015/0198926 A1     Jul. 16, 2015

(30) Foreign Application Priority Data

Jun. 21, 2012   (EP) .................................. 12173045

(51) Int. Cl.
*G04B 31/02* (2006.01)
*G04B 31/04* (2006.01)
*F16F 15/06* (2006.01)

(52) U.S. Cl.
CPC .............. *G04B 31/02* (2013.01); *F16F 15/06* (2013.01); *G04B 31/04* (2013.01)

(58) Field of Classification Search
CPC .......... G01C 9/06; G04B 17/26; G04B 31/02; G04B 31/04; F16F 15/06
USPC ........................................................ 368/127
See application file for complete search history.

(56) References Cited

U.S. PATENT DOCUMENTS

| 2,233,743 | A | * | 3/1941 | Fritz | ...................... | G04B 31/04 |
| | | | | | | 368/324 |
| 2,664,697 | A | * | 1/1954 | Vuilleumier | ........... | G04B 31/04 |
| | | | | | | 368/326 |
| 2,827,758 | A | * | 3/1958 | Voumard | ............... | G04B 31/04 |
| | | | | | | 368/326 |

(Continued)

FOREIGN PATENT DOCUMENTS

| CH | 291856 | 7/1953 |
| CH | 301023 | 8/1954 |

(Continued)

OTHER PUBLICATIONS

Translation of FR 2197423—worldwide.espacenet.com—Jun. 25, 2015.*
International Search Report issued Jan. 24, 2014, in PCT/EP13/062801 filed Jun. 19, 2013.

*Primary Examiner* — Sean Kayes
(74) *Attorney, Agent, or Firm* — Oblon, McClelland, Maier & Neustadt, L.L.P.

(57) ABSTRACT

A shock-absorber bearing for a staff of a moving part of a timepiece, the bearing including a support including a housing configured to receive a pivot module configured to cooperate with the staff, and an elastic mechanism configured to exert at least one axial force on the pivot module to retain the module in its housing.

20 Claims, 4 Drawing Sheets

(56) References Cited

U.S. PATENT DOCUMENTS

| | | | | |
|---|---|---|---|---|
| 2,891,379 | A * | 6/1959 | Seitz | G04B 31/04 368/326 |
| 2,973,618 | A * | 3/1961 | Morf | G04B 31/04 368/326 |
| 3,306,028 | A * | 2/1967 | Suzuki | G04B 31/04 368/326 |
| 3,500,632 | A * | 3/1970 | Fritz | F16C 17/08 368/326 |
| 4,143,511 | A * | 3/1979 | Bachmann | G04B 31/04 368/326 |
| 7,234,859 | B2 * | 6/2007 | Kohler | G04B 31/04 368/326 |
| 2003/0137901 | A1 * | 7/2003 | Tokoro et al. | 368/127 |
| 2004/0264304 | A1 * | 12/2004 | Furukawa et al. | 368/223 |
| 2010/0254227 | A1 * | 10/2010 | Kamiya | 368/101 |
| 2012/0155231 | A1 * | 6/2012 | Conus et al. | 368/324 |

FOREIGN PATENT DOCUMENTS

| | | |
|---|---|---|
| CH | 328802 | 3/1958 |
| CH | 332554 | 9/1958 |
| CH | 356723 | 8/1961 |
| CH | 698 675 | 9/2009 |
| DE | 1 447 385 | 11/1968 |
| FR | 2 197 423 | 3/1974 |
| FR | 2 336 588 | 7/1977 |

\* cited by examiner

NON-DISMANTLABLE SHOCK-PROOF SYSTEM FOR TIMEPIECE

CROSS-REFERENCE TO RELATED APPLICATIONS

This is a National phase application in the U.S. of International Patent Application PCT/EP2013/062801 filed Jun. 19, 2013 which claims priority on European patent application No. 12173045.1 filed Jun. 21, 2012. The entire disclosures of each of which are hereby incorporated herein by reference.

The present invention relates to a shock-proof bearing for a staff of a moving part of a timepiece. The staff comprises a small rod, comprising a support, said support being provided with a housing which is intended to receive a pivot system into which the small rod is inserted. The shock-proof bearing comprises furthermore elastic means designed to exert at least one axial force on said pivot system in order to retain said pivot system in the housing.

The technical field of the invention is the technical field of precision engineering.

TECHNOLOGICAL BACKGROUND

The present invention relates to bearings for timepieces, more particularly of the type allowing shocks to be absorbed. The constructors of mechanical watches have, for a long time, been designing numerous devices which allow a staff to absorb the energy resulting from a shock, in particular a lateral shock, by abutment against a wall of the hole of the base block which it traverses, whilst allowing a momentary displacement of the small rod before it is returned to its lock position under the action of a spring.

FIGS. 1 and 2 illustrate a device termed inverted double cone which is currently used in timepieces found on the market.

A support 1, the base of which comprises a hole 2 for the passage of the balance staff 3 ended by a small rod 3a, makes it possible to position a jewelled bearing 20 in which there are immobilised a pierced stone 4 traversed by the small rod 3a and a counter-pivot stone 5. The jewelled bearing 20 is retained in a housing 6 of the support 1 by a spring 10 which, in this example, comprises radial extensions 9 which compress the counter-pivot stone 5. The housing 6 comprises two bearing surfaces 7, 7a in the form of inverted cones on which the complementary bearing surfaces 8, 8a of the jewelled bearing 20 are supported, said bearing surfaces requiring to be produced with very great precision. In the case of an axial shock, the pierced stone 4, the counter-pivot stone 5 and the balance staff are displaced and the spring 10 acts alone to return the balance staff 3 into its initial position. The spring 10 is dimensioned to have a displacement limit so that, beyond this limit, the balance staff 3 comes into contact with stops 14 making it possible for said staff 3 to absorb the shock, which the small rods 3a of the staff 3 cannot do without the risk of breaking. In the case of lateral shock, i.e. when the end of the small rod unbalances the jewelled bearing 20 out of its lock plane, the spring 10 cooperates with the complementary inclined planes 7, 7a; 8, 8a in order to re-centre the jewelled bearing 20. Such bearings have been sold for example under the trademark Incabloc®. These springs can be produced in chromium-cobalt alloy or brass and are manufactured by traditional cutting means.

Now, a disadvantage of these shock-absorber bearings is that they are dismantlable. In fact, it is intended that these shock-absorber bearings are able to be dismantled for servicing operations after sale and maintenance. Shock-absorber bearings are therefore obtained, the assembly of which is not easy. Effectively, some parts, such as the support 1 and the spring 10, must be orientated and manipulated in a certain manner during the assembly operation in order to assemble the shock-absorber bearing. Consequently, not only are the constituent parts of the shock-absorber bearing complex but furthermore total automation of the assembly is not possible and makes said shock-absorber bearing more expensive.

SUMMARY OF THE INVENTION

The object of the invention is to remedy the disadvantages of prior art by proposing to provide a non-dismantlable shock-absorber bearing of a timepiece which is simple to mount.

To this end, the invention relates to a shock-absorber bearing for a staff of a moving part of a timepiece, said bearing comprising a support provided with a housing which is intended to receive a pivot module designed to cooperate with said staff, said bearing comprising furthermore elastic means designed to exert at least one axial force on said pivot module in order to retain said module in its housing, characterised in that the elastic means comprise an annular spring and are fixed to the support permanently by a material linkage between said elastic means and the support, said annular spring comprising at least two specific attachment zones for fixing said annular spring to the support.

A first advantage of the present invention is to make it possible to have a non-dismantlable shock-proof system which is simple to produce and to assemble. In fact, the present invention has the advantage of having parts which are placed one on the other without requiring to be manipulated in a particular manner. Hence, the assembly process can be automated. This simplicity of the parts and of the assembly process makes it possible to have an inexpensive shock-absorber.

In a first advantageous embodiment, the elastic means are fixed on the support by welding/soldering.

In a second advantageous embodiment, the elastic means are fixed on the support by gluing.

In a third advantageous embodiment, the elastic means comprise an annular spring which has at least one internal radial extension extending towards the centre of said annular spring.

In another advantageous embodiment, said annular spring comprises at least two external radial extensions which extend towards the outside of said annular spring and serve as specific attachment zones.

In another advantageous embodiment, the annular spring comprises three external radial extensions and three internal radial extensions.

The present invention likewise relates to a clock movement comprising a bottom plate and at least one bridge, said bottom plate comprising an orifice. Into said orifice of said bottom plate, a shock-absorber bearing according to the invention is inserted.

The present invention likewise relates to a clock movement comprising a bottom plate and at least one bridge, said at least one bridge comprising an orifice. Into said orifice of said at least one bridge, a shock-absorber bearing according to the invention is inserted.

In an advantageous embodiment, the support of the shock-absorber bearing and said bottom plate are monobloc.

In an advantageous embodiment, the support of the shock-absorber bearing and said at least one bridge are monobloc.

The invention likewise relates to a timepiece comprising a width closed by a casing and a base. The timepiece comprises a clock movement according to the invention.

BRIEF DESCRIPTION OF THE FIGURES

The aims, advantages and features of the shock-absorber bearing according to the present invention will appear more clearly in the following detailed description of at least one embodiment of the invention which is given solely by way of non-limiting example and illustrated by the annexed drawings in which.

DETAILED DESCRIPTION

The present invention arises from the general inventive idea which consists of producing a simple non-dismantlable shock-absorber system. This shock-absorber system is designed to be mounted on a bottom plate and/or on at least one bridge of a clock movement. The clock movement is placed in a timepiece comprising a width closed by a base and a crystal.

Figure 1:
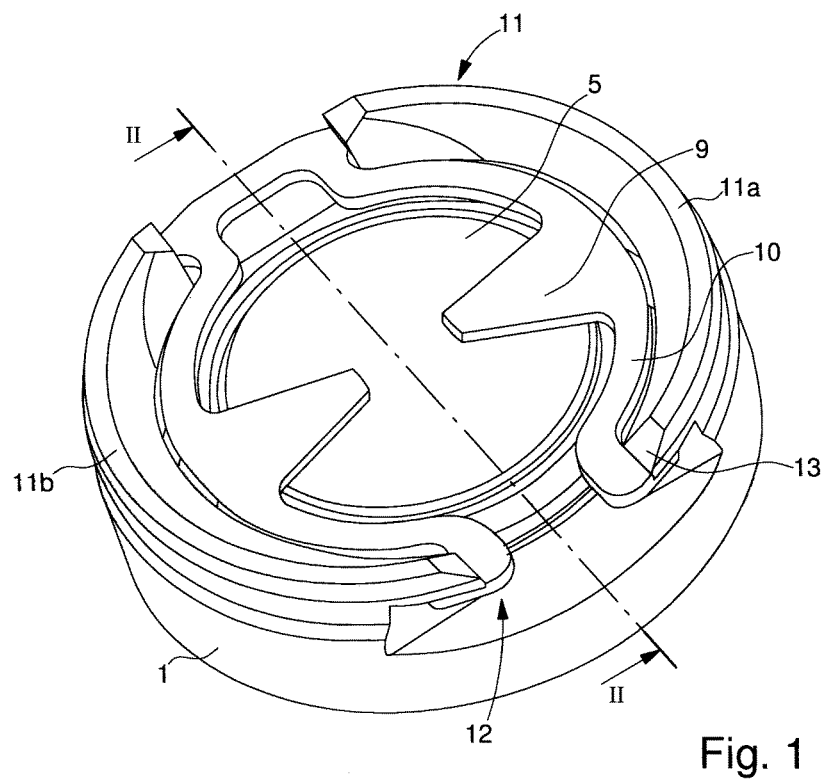
FIGS. 1 and 2, already cited, make it possible to represent schematically a shock-absorber system of the timepiece according to prior art.
Figure 2:
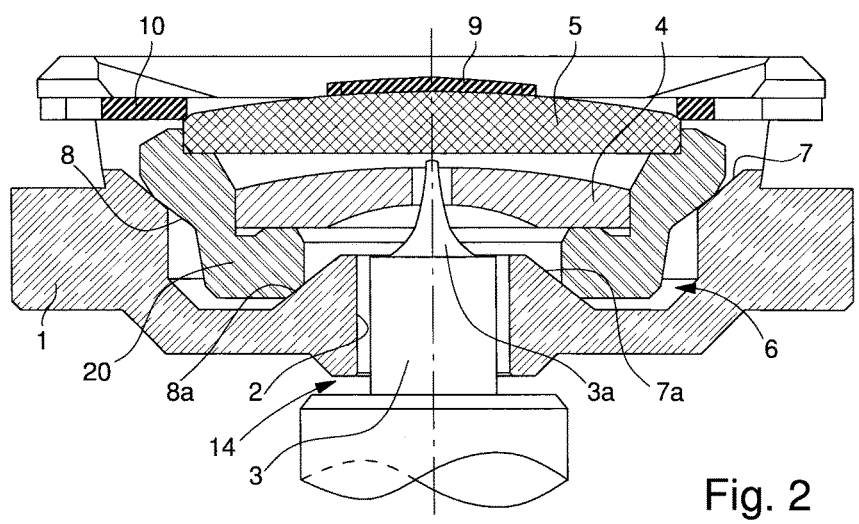
Figure 3:
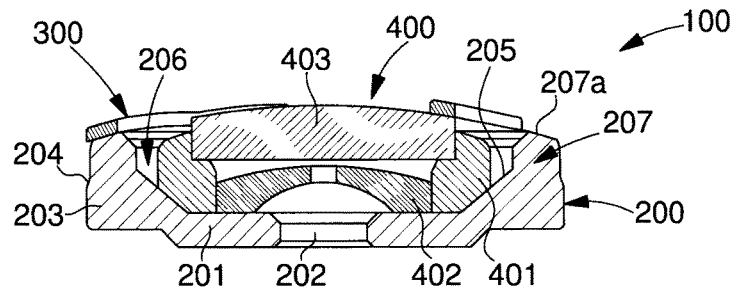
FIG. 3 represents schematically a shock-absorber system of the timepiece according to the invention.

In FIG. 3, a shock-absorber bearing, also termed shock-proof system 100, is represented. This shock-absorber bearing 100 comprises a support 200. This support 200 has the shape of a base 201, provided with a hole 202, from which a peripheral rim 203 extends. The latter has an external flank 204 and an internal flank 205. This rim 203 makes it possible to define a housing 206 into which a pivot module 400 is inserted. This standard pivot module 400 comprises a jewelled bearing 401, i.e. a part which has a circular central orifice and an external wall and an internal wall. Into the internal wall, a pierced stone 402 is inserted, the diameter of which corresponds to that of the central orifice. The internal wall comprises a shoulder so that a counter-pivot stone 403 can be fixed. The pivot module 400 is then placed in the housing 206 of the support 200 and cooperates with the small rod of a staff. Preferably, the support 200, the housing 206 and the pivot module 400 have a circular shape.

The shock-absorber bearing 100 comprises furthermore elastic means 300 which are designed to cooperate with the pivot module 400 so as to absorb shocks and to return the pivot module 400 into its lock position when the stress associated with the shocks subsides.

Advantageously according to the invention, the elastic means 300 are fixed so as to be integral with the support 200. There is understood by this that the elastic means 300, once fixed to the support 200, can no longer be separated, made non-integral with the support. The elastic means 300 are fixed permanently to the support 200. The fixing of the elastic means 300 to the support 200 is therefore definitive. In order to do this, the elastic means 300 are fixed on the support 200 by welding or soldering or gluing. A material linkage therefore exists between the elastic means 300 and the support 200. This linkage can be made of glue or soldering or welding. The elastic means 300 form a cover placed on the support which retains the pivot module 400 in the housing 206, the shock-proof system 100 thus becoming non-dismantlable.

This fixing to the support 200 takes place at the level of the rim 203. The rim 203, at its end 207, has a surface 207a acting as support surface on which the elastic means 300 can be fixed. The external flank 204 of the support 200 can likewise act as surface on which the elastic means 300 are fixed.

The advantage of such a feature is to make it possible to have a simplified shock-absorber bearing 100 for there is no longer the constraint of being dismantlable and therefore the shapes can be more simple.

During assembly of the shock-proof system 100, an axial mounting is used. The first step therefore consists of providing the support 200. Then the pivot module 400 is provided which is placed in the housing 206 of the support. Then, the elastic means 300 are placed and fixed. In the case of elastic means 300 fixed to the end 207 of the support 200 acting as support surface 207a, the elastic means 300 are simply placed on the support 200. Spots of glue or welding are then applied in order to fix said elastic means 300.

Figure 4:
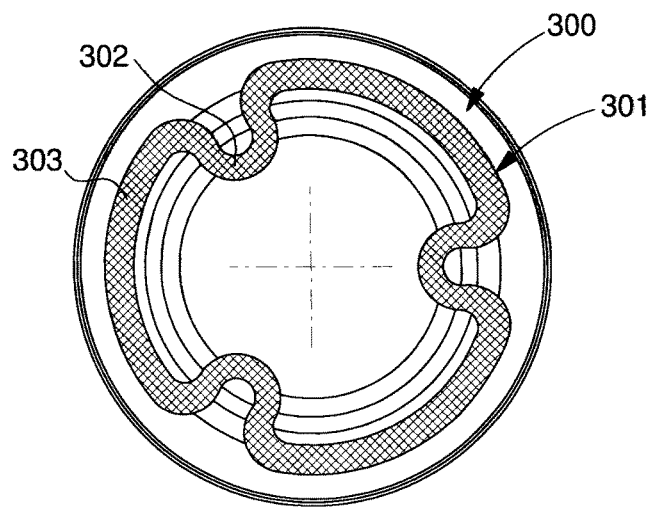
FIG. 4 represents schematically a view from above of a spring for the shock-absorber system of the timepiece according to the invention.

In an embodiment of the elastic means, the elastic means 300 have the shape of an annular spring 301. This annular spring is of the flat type, i.e. it is formed from a metallic strip, i.e. which has a greater width than thickness. In order to place said pivot module 400 in the housing 206 of the support 200, the annular spring 301 comprises internal radial extensions 302. These internal radial extensions 302 are formed by the strip which forms the spring 301 and are curved back towards the inside of the spring 301. These internal radial extensions 302 are preferably distributed regularly over the flat spring 301 so that the annular spring 301 can act homogeneously as can be seen in FIG. 4. The fixing of the annular spring 301 to the support 200 takes place at the level of circular portions 303 situated between the internal radial extensions 302. The annular spring 301 can be produced in a metallic material such as brass or any other material which can be used in timepiece applications.

Figure 5:
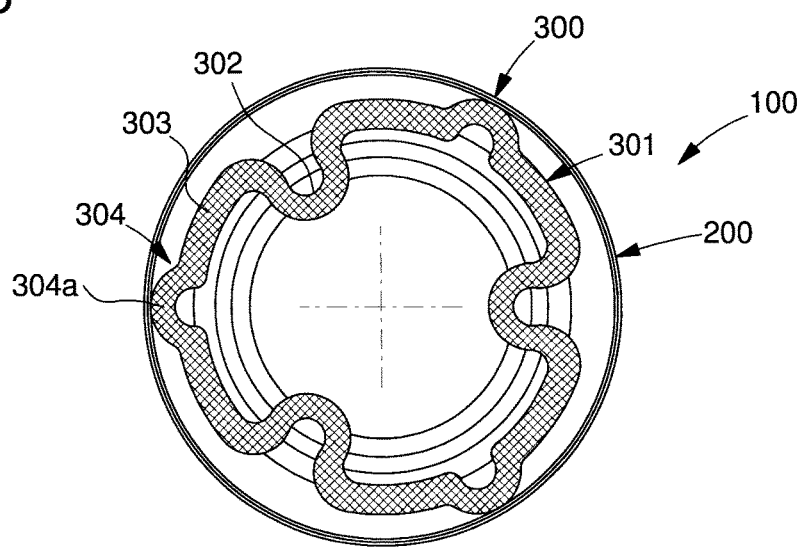
FIGS. 5 and 6 represent schematically various views of a preferred embodiment of a spring for the shock-absorber system of the timepiece according to the invention.
Figure 6:
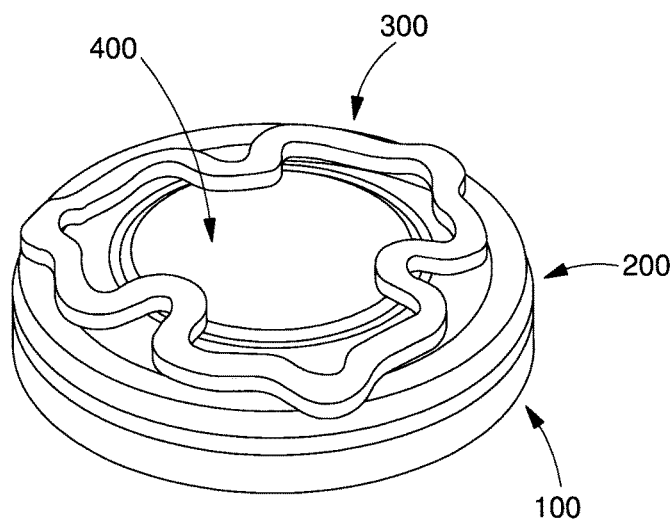

In a first advantageous variant, the annular spring 301 comprises specific attachment zones 304, as can be seen in FIGS. 5 and 6. In fact, in the case of the annular spring 301 which can be seen in FIG. 4, the fixing to the support 200 by the circular portions 303 can involve a modification of the properties of the annular spring 301.

Now, the specific attachment zones 304 are zones designed to limit the influence of the fixing by welding or gluing on the properties of said annular spring 301. These zones have the shape of external radial extensions 304a which extend towards the outside of the spring 301. It is understood therefore that these specific attachment zones 304 are formed by the strip forming the spring 301 which is curved back towards the outside of the spring 301. For preference, the curve of the external radial extensions 304a is less pronounced than those of the internal radial extensions 302. It is understood by this that the distance between the ends of the external radial extensions 304a and the strip forming the spring 301 is larger than the distance between the ends of the internal radial extensions 302 and said strip forming the spring 301. The annular spring 301 according to this variant is advantageously dimensioned so that, during fixing of said spring 301 to the support 200, only the specific attachment zones 304 formed by the external radial extensions 304a are in contact with the support 200 which allows the fixing. This configuration makes it possible for the zones other than these specific attachment zones 304 to be deformed freely when an axial stress is applied on the pivot module 400 by the staff.

For preference, the annular spring 301 is designed to have three internal radial extensions 302 and three specific attachment zones 304, i.e. three external radial extensions 304a. The three internal radial extensions 302 are designed to be offset relative to each other by 120°. The three external radial extensions 304a are designed to be offset relative to each other by 120°. Providing external radial extensions 304a and internal radial extensions 302 is produced so that the external radial extensions 304a and the internal radial extensions 302 are alternated and offset relative to each other by 60°. It is understood that an internal radial extension 302 is situated between two external radial extensions 304a.

The advantage of the shock-absorber bearing 100 is of not having any specific orientation. In fact, as all the constituent parts of said shock-proof system 100 are circular, there is no need to orientate them relative to each other. The support 200 has no particular zones on which the annular spring 301 must be fixed. In this way, the assembly process of such a shock-absorber system 100 can be automated to the full.

In a second variant, the internal flank 205 has an inclined portion which allows better centring of the pivot module 400. In fact during an axial shock, the staff exerts an axial force on the pivot module 400 so that the latter lifts and deforms the elastic means 300. These elastic means 300 retain the pivot module 400 so that, when the latter is no longer subjected to a stress, the elastic means 300 resume their lock position and place the pivot module 400 in the housing 206. Now, when the pivot module 400 is lifted from the housing 206 by the staff, it is possible that the pivot module 400 becomes offset under the effect of a force such as gravity and is displaced radially. In this case, when the pivot module 400 resumes its position in the housing 206, the pivot module 400 will come into contact with the inclined portion of the internal flank 205. This inclined portion 205 guides the pivot module 400 towards its initial position, i.e. its lock position, so that the pivot module 400 is perfectly centred.

In a third variant the pivot module 400 has the monobloc shape.

Figure 7:
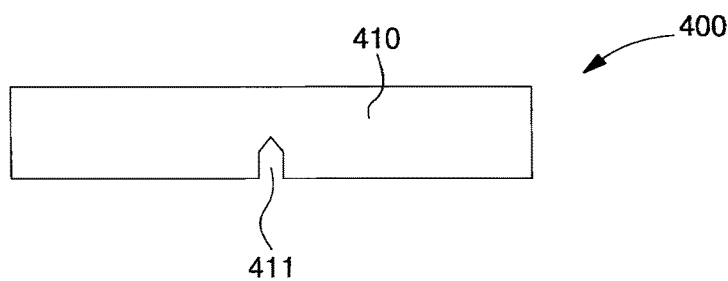
FIGS. 7 to 9 represent schematically various variants for the pivot module of the shock-absorber system of the timepiece according to the invention.

In a first alternative which can be seen in FIG. 7, the pivot module 400 comprises a single stone 410. This single stone 410 has a cylindrical shape which has a small height relative to the radius. This single stone 410 comprises, at the level of its central axis, a recessed hole 411 into which the small rod of the staff can be inserted. This configuration with a single stone 410 makes it possible to have a pivot module 400 which is more compact and simplified because it makes it possible to have a shock-absorber system 100 composed of only three parts: the support 200, the single stone 410 and the annular spring 301. Consequently, the dimensions of the support 200 can be reduced.

Figure 8:
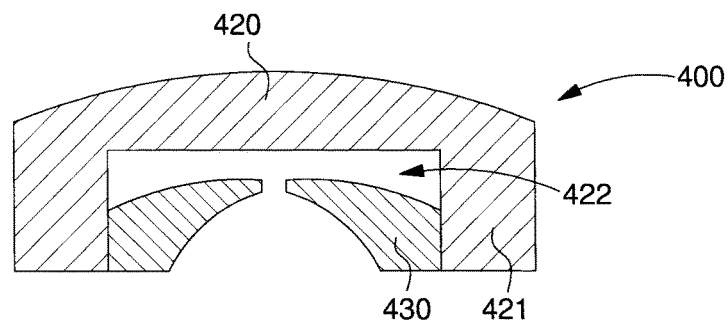

In a second alternative which can be seen in FIG. 8, the pierced stone 430 and the counter-pivot stone 420 are fixed to each other without the intermediary of an jewelled bearing. For this, the counter-pivot stone 420 acts as jewelled bearing. The counter-pivot stone 420 is then provided with a peripheral rim 421 which defines a housing 422 in which the pierced stone 430 is placed. This alternative makes it possible to have a simplified pivot module 400 but having dimensions similar to those of a pivot module 400 with jewelled bearing. The dimensions of the support remain therefore unchanged in order to be adapted to this alternative.

Figure 9:
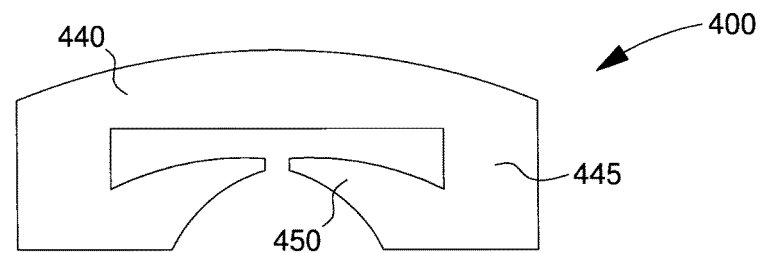

In another alternative which can be seen in FIG. 9, the pierced stone 450 and the counter-pivot stone 440 are monobloc. The pivot module 400 resembles the pivot module of the second alternative except that, instead of having the pierced stone 450 and the counter-pivot stone 440 fixed to each other, they are directly integral via the slant of an attachment element 445. The advantage accrues here of having a single part whilst keeping standard dimensions to the standard pivot modules comprising a jewelled bearing in which a pierced stone and a counter-pivot stone are placed.

Figure 10:
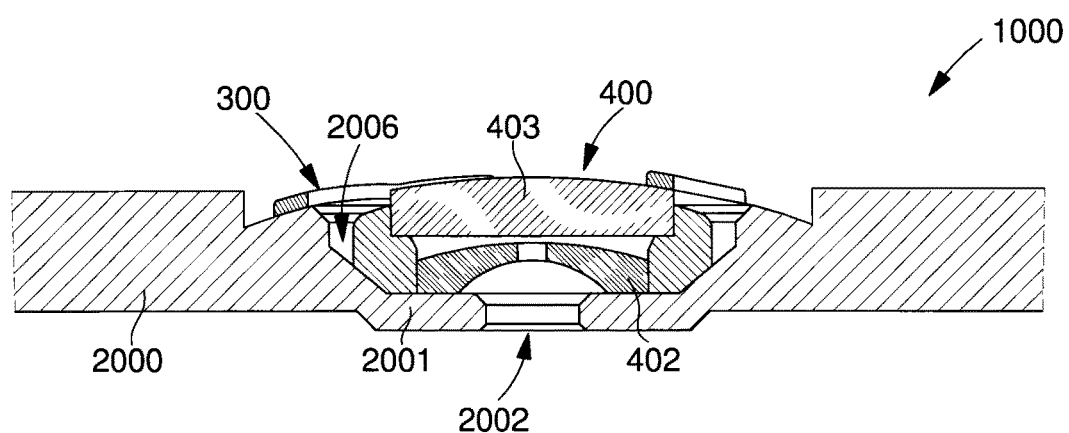
FIG. 10 represents schematically a monobloc variant of the shock-absorber system of the timepiece according to the invention.

In another variant which can be seen in FIG. 10, the support is monobloc with the place on which the shock-absorber bearing is fixed. In fact, a shock-absorber bearing is designed to be installed at the level of a bridge or of a bottom place of a clock movement. This clock movement has traversing orifices produced on the bottom plate or the bridges. In these orifices, a shock-proof system 100 is inserted, each orifice being dimensioned so that the support 200 can be slid there.

In order to achieve an assembly step, the support is directly produced on the bridge or bridges and the bottom plate in order to form a shock-absorber assembly 1000. The bottom plate and/or the bridges form the support 2000, machined to leave a base 2001 comprising a hole 2002 exposed. The support 2000 has a housing 2006 in which the pivot module 400 is placed. The annular spring 301 is fixed on the upper face of the support 2000. This variant likewise makes it possible to have one part less because the support 200 no longer exists.

It will be understood that various modifications and/or improvements and/or combinations which are evident to the person skilled in the art can be applied to various embodiments of the invention, presented above without departing from the scope of the invention defined by the annexed claims.

The invention claimed is:

1. A shock-absorber bearing for a staff of a moving part of a timepiece, the bearing comprising:
   a support including a housing configured to receive a pivot module configured to cooperate with the staff;
   elastic means configured to exert at least one axial force on the pivot module to retain the module in the housing;
   wherein the elastic means comprises an annular spring that is a single piece and is fixed to an uppermost face of the support by a material linkage between the elastic means and the uppermost face of the support, the annular spring comprising at least two separate convex portions where an outer perimeter of the annular spring has a convex shape oriented facing outward from the annular spring, each of the two separate convex portions of the annular spring including, along the outer perimeter:
      a specific attachment zone attached to the uppermost face of the support by the material linkage for fixing the annular spring to the support; and
      at least one circular portion that is not fixed to the support,
   wherein the specific attachment zone has a convex shape that has a greater curvature than a convex shape of the at least one circular portion.

2. A shock-absorber bearing according to claim 1, wherein the annular spring is fixed to the support only at the specific attachment zones.

3. A shock-absorber bearing according to claim 2, wherein the specific attachment zones are not continuous around a periphery of the annular spring.

4. A shock-absorber bearing according to claim 1, wherein the elastic means is fixed on the support by welding or soldering.

5. A shock-absorber bearing according to claim 1, wherein the elastic means is fixed on the support by glueing.

6. A shock-absorber bearing according to claim 1, wherein the annular spring includes at least one internal radial extension extending towards a central axis of the annular spring.

7. A shock-absorber bearing according to claim 1, wherein each of the two separate convex portions of the annular spring comprises a radial extension that extends further towards an outside of the annular spring in a radial direction than the circular portions, and each of the specific attachment zones is on one of the external radial extensions.

8. A shock-absorber bearing according to claim 7, wherein, for each of the external radial extensions, a first end abuts an end of one of the circular portions and a second end, opposite to the first end, abuts an end of another one of the circular portions.

9. A shock-absorber bearing according to claim 1, wherein the annular spring comprises three of the separate convex portions.

10. A shock-absorber bearing according to claim 9, wherein, for each of the external radial extensions, a first end abuts an end of one of the circular portions and a second end, opposite to the first end, abuts an end of another one of the circular portions.

11. A clock movement comprising a bottom plate and at least one bridge, the bottom plate comprising an orifice, wherein, into the orifice of the bottom plate, a shock-absorber bearing according to claim 1 is inserted.

12. A clock movement according to claim 11, wherein the support of the shock-absorber bearing and the bottom plate are monobloc.

13. A timepiece comprising a width closed by a casing and a base, wherein the timepiece comprises a clock movement according to claim 12.

14. A timepiece comprising a width closed by a casing and a base, wherein the timepiece comprises a clock movement according to claim 11.

15. A clock movement comprising a bottom plate and at least one bridge, the at least one bridge comprising an orifice, wherein, into the orifice of the at least one bridge, a shock-absorber bearing according to claim 1 is inserted.

16. A timepiece comprising a width closed by a casing and a base, wherein the timepiece comprises a clock movement according to claim 15.

17. A clock movement according to claim 15, wherein the support of the shock-absorber bearing and the at least one bridge are monobloc.

18. A timepiece comprising a width closed by a casing and a base, wherein the timepiece comprises a clock movement according to claim 17.

19. A shock-absorber bearing for a staff of a moving part of a timepiece, the bearing comprising:
  a support including a housing configured to receive a pivot module configured to cooperate with the staff,
  an annular spring configured to exert at least one axial force on the pivot module to retain the module in the housing, the annular spring is a single piece including circular portions, internal radial extensions that extend further towards a central axis of the annular spring than the circular portions, and external radial extensions that extend further towards an outside of the annular spring in a radial direction than the circular portions;
  wherein the external radial extensions and the circular portions have a convex outer perimeter oriented facing outward from the annular spring and the internal radial extensions have a concave outer perimeter oriented facing outward from the annular spring, and
  wherein the annular spring is fixed only to an uppermost face of the support by a material linkage between the annular spring and the uppermost face of the support at specific attachment zones, and each of the specific attachment zones is on one of the external radial extensions such that the circular portions do not contact the support.

20. A shock-absorber bearing according to claim 19, wherein, for each of the external radial extensions, a first end abuts an end of one of the circular portions and a second end, opposite to the first end, abuts an end of another one of the circular portions.

* * * * *